(12) United States Patent
Lee et al.

(10) Patent No.: US 11,577,657 B2
(45) Date of Patent: Feb. 14, 2023

(54) VEHICULAR LUGGAGE TRAY APPARATUS

(71) Applicants: HYUNDAI MOTOR COMPANY, Seoul (KR); KIA CORPORATION, Seoul (KR); DAEJOO PRECISION INDUSTRIAL, Hwaseong-si (KR)

(72) Inventors: Kyoung Ho Lee, Seoul (KR); Seung Soo Ryu, Gunpo-si (KR); Jae Yong Lee, Uiwang-si (KR); Kwang Ok Jeon, Seoul (KR); Tae Woo Kim, Suwon-si (KR); Dong Ju Kim, Suwon-si (KR); Kyoung Jun Jin, Osan-si (KR)

(73) Assignees: HYUNDAI MOTOR COMPANY, Seoul (KR); KIA CORPORATION, Seoul (KR); DAEJOO PRECISION INDUSTRIAL, Hwaseong-Si (KR)

( * ) Notice: Subject to any disclaimer, the term of this patent is extended or adjusted under 35 U.S.C. 154(b) by 55 days.

(21) Appl. No.: 17/319,509

(22) Filed: May 13, 2021

(65) Prior Publication Data
US 2022/0126757 A1 Apr. 28, 2022

(30) Foreign Application Priority Data
Oct. 27, 2020 (KR) .................... 10-2020-0140308

(51) Int. Cl.
*B60R 7/04* (2006.01)
(52) U.S. Cl.
CPC ..................... *B60R 7/04* (2013.01)
(58) Field of Classification Search
CPC .... B60R 7/04; B60R 7/02; B60R 5/04; B60R 5/044; B60R 2011/0036; B60R 2011/0059; B60R 2011/0085
USPC ............... 296/37.1, 37.8, 37.16, 37.5, 37.13
See application file for complete search history.

(56) References Cited

U.S. PATENT DOCUMENTS

| | | | |
|---|---|---|---|
| 1,406,129 A | 2/1922 | Woltz | |
| 2,650,871 A | 9/1953 | Holderegger | |
| 2,788,253 A | 4/1957 | Gussack | |
| 2,798,445 A | 7/1957 | Gehman | |
| 2,867,471 A | 1/1959 | Coon, Jr. | |
| 3,519,319 A | 7/1970 | Taylor | |
| 5,263,467 A | 11/1993 | Jones | |
| 5,795,005 A | 8/1998 | Garfias et al. | |
| 5,800,004 A * | 9/1998 | Ackeret ................... B60R 7/12 296/37.13 |
| 6,263,867 B1 | 7/2001 | Skelton | |
| 8,770,643 B2 | 7/2014 | Auerbach et al. | |
| 9,016,748 B1 | 4/2015 | Ardigo | |
| 9,598,024 B2 | 3/2017 | Kogut | |
| 9,944,333 B1 | 4/2018 | Stojkovic et al. | |
| 10,286,851 B2 * | 5/2019 | Koo ....................... B60R 7/08 |

(Continued)

FOREIGN PATENT DOCUMENTS

CN 108407581 A 8/2018
EP 3034355 A1 6/2016

(Continued)

*Primary Examiner* — D Glenn Dayoan
*Assistant Examiner* — E Turner Hicks
(74) *Attorney, Agent, or Firm* — McDonnell Boehnen Hulbert & Berghoff LLP

(57) ABSTRACT

A vehicular luggage tray apparatus is capable of receiving and storing goods in a main tray and a sub tray, and of receiving and storing the main tray and the sub tray in an unused space in a side wall of a luggage room of a vehicle.

17 Claims, 19 Drawing Sheets

(56) References Cited

U.S. PATENT DOCUMENTS

| | | | |
|---|---|---|---|
| 10,351,067 B2 * | 7/2019 | Koo | B60R 11/02 |
| 10,682,942 B2 | 6/2020 | Tollefson et al. | |
| 11,128,448 B1 | 9/2021 | Bernat et al. | |
| 2009/0189404 A1 | 7/2009 | Anderson et al. | |
| 2012/0299324 A1 | 11/2012 | Langenbacher et al. | |
| 2017/0253196 A1 | 9/2017 | Barrow et al. | |
| 2018/0222293 A1 | 8/2018 | Thomas et al. | |
| 2019/0232851 A1 | 8/2019 | Scott et al. | |
| 2019/0248294 A1 | 8/2019 | Persson et al. | |
| 2020/0130587 A1 * | 4/2020 | Cho | B60R 5/04 |
| 2020/0324705 A1 * | 10/2020 | Lee | B60R 5/044 |
| 2020/0324706 A1 * | 10/2020 | Cho | B60R 7/04 |

FOREIGN PATENT DOCUMENTS

| | | |
|---|---|---|
| EP | 3147160 A2 | 3/2017 |
| FR | 2900700 A1 | 11/2007 |
| FR | 2979303 A1 | 3/2013 |
| JP | 2005-247238 A | 9/2005 |
| KR | 2003-0008913 A | 1/2003 |
| KR | 20-0331590 Y1 | 11/2003 |

* cited by examiner

VEHICULAR LUGGAGE TRAY APPARATUS

CROSS REFERENCE TO RELATED APPLICATIONS

This application claims the priority benefit of Korean Patent Application No. 10-2020-0140308, filed on Oct. 27, 2020, in the Korean Intellectual Property Office, the disclosure of which is incorporated herein by reference.

BACKGROUND

1. Field

The present disclosure relates to a vehicular luggage tray apparatus, and more particularly to a vehicular luggage tray apparatus capable of receiving goods in an unused space in a side wall of a luggage room.

2. Description of the Related Art

In general, a leisure vehicle (RV, SUV, MPV or the like) is provided with a luggage room capable of receiving baggage in the space behind a rear seat, and a luggage side trim constituting the luggage room is provided with a tray having a simple structure, which in open toward the luggage room.

Because such an open tray having a simple structure has a relatively small reception space, the tray is incapable of storing a large quantity of goods. Particularly, unused space in a side wall of a luggage room (a space remaining when optional accessories such as an air conditioner for a rear seat, a subwoofer or the like are not installed) is not sufficiently used. Furthermore, there is a disadvantage of a deteriorated appearance because the tray is open toward the luggage room.

Details described as the background art are intended merely for the purpose of promoting the understanding of the background of the present disclosure and should not be construed as an acknowledgment of the prior art that is previously known to those of ordinary skill in the art.

SUMMARY

Therefore, the present disclosure has been made in view of the above problems, and it is an object of the present disclosure to provide a vehicular luggage tray apparatus including a main tray adapted to be pulled out into a luggage room from a reception space in a luggage side trim, and a sub tray adapted to be pulled out into a reception space from a space in an inner wall of the reception space after the main tray is taken out, which is capable of increasing the efficiency of utilization of space and the receiving capacity by optimally utilizing an unused space in a side wall of the luggage room and is capable of improving the appearance by preventing goods received in the reception space from being exposed to the luggage room.

In accordance with the present disclosure, the above and other objects can be accomplished by the provision of a vehicular luggage tray apparatus including a main tray, which is adapted to be rotated with respect to a trim in an internal space in a vehicle so as to be received in a reception space in the trim and to be taken out therefrom, wherein, when a locked state of the main tray is released in a state in which the main tray is received in the reception space, the main tray is automatically rotated and is opened to a predetermined angle by the elastic force of a rotating hinge portion.

After the main tray is automatically rotated and is opened by the elastic force, the main tray may be further rotated to wider opening angle by manual manipulation by a user.

The vehicular luggage tray apparatus may further include a sub tray, which is opened outwardly into the reception space from an inner wall of the reception space after the main tray is taken out of the reception space.

The main tray may include a tray cover adapted to open and close the reception space when the main tray is rotated, and a tray body, which is coupled to an inner surface of the tray cover and in which goods are loaded, and the tray body may have formed therein a body hole through which the goods are inserted and loaded in the tray body.

The vehicular luggage tray apparatus may further include a tray strap, which is disposed across the body hole so as to hold the goods loaded in the tray body.

The tray body may include an upper shelf.

An inner bottom surface of the tray body and a bottom surface of the upper shelf may be provided with respective pad members for preventing the generation of noise.

The vehicular luggage tray apparatus may further include a locking unit provided at the main tray so as to be locked to and unlocked from a luggage side trim, and the main tray may be automatically rotated and be first opened outwardly by spring force when the locked state of the locking unit is released.

The locking unit may include a locking knob rotatably coupled to a front surface of the main tray, a locking rod, which is in contact with the locking knob and is movable along a guide groove formed in the main tray, and a locking spring disposed in the guide groove so as to elastically support the locking rod, and the main tray may be locked when an end of the locking rod is inserted into a locking hole formed in the luggage side trim, and the locked state of the main tray may be released when the end of the locking rod is separated from the locking hole.

The vehicular luggage tray apparatus may further include a rotating hinge bracket coupled to a side surface of the main tray, a stationary hinge bracket coupled to a luggage side trim at a position corresponding to the rotating hinge bracket, and a hinge shaft, which extends through the rotating hinge bracket and the stationary hinge bracket and connects the rotating hinge bracket and the stationary hinge bracket to each other, and the main tray may be rotated with respect to the luggage side trim when the rotating hinge bracket is rotated about the hinge shaft with respect to the stationary hinge bracket.

The vehicular luggage tray apparatus may further include a hinge spring, which is wound around the hinge shaft and which is supported at one end thereof by the rotating hinge bracket and at a remaining end thereof by the stationary hinge bracket, and the main tray may be automatically rotated and may be first opened outwardly an amount corresponding to a predetermined opening angle by the elastic force of the hinge spring.

A stopper may be fixedly coupled to each of two ends of the stationary hinge bracket, and each of two ends of the rotating hinge bracket may be provided with a rotating portion through which the hinge shaft extends, wherein, when the main tray is automatically rotated and is first opened outwardly by the elastic force of the hinge spring, the rotating portions of the rotating hinge bracket come into contact with the stoppers, thereby limiting the first opening angle to which the main tray is first rotated by the spring force.

When the main tray is further opened by manual manipulation by a user after the main tray is first opened, the rotating portions may be rotated along surfaces of the stoppers, whereby the main tray is further opened by the manual manipulation by the user.

The two ends of the stationary hinge bracket may be provided with respective bracket protrusions such that, when the main tray is manually taken out, the rotating portions of the rotating hinge bracket come into contact with the bracket protrusions, thereby limiting a second opening angle of the main tray.

Each of the bracket protrusions may include a pad member coupled thereto for eliminating noise due to contact with the rotating portion.

A bracket cover may be coupled to the rotating hinge bracket to prevent exposure of the rotating hinge bracket coupled to the main tray in the state in which the main tray is taken out.

The sub tray may be manually taken out by a user to be used.

BRIEF DESCRIPTION OF THE FIGURES

The above and other objects, features and other advantages of the present disclosure will be more clearly understood from the following detailed description taken in conjunction with the accompanying drawings, in which.

DETAILED DESCRIPTION

Figure 1:
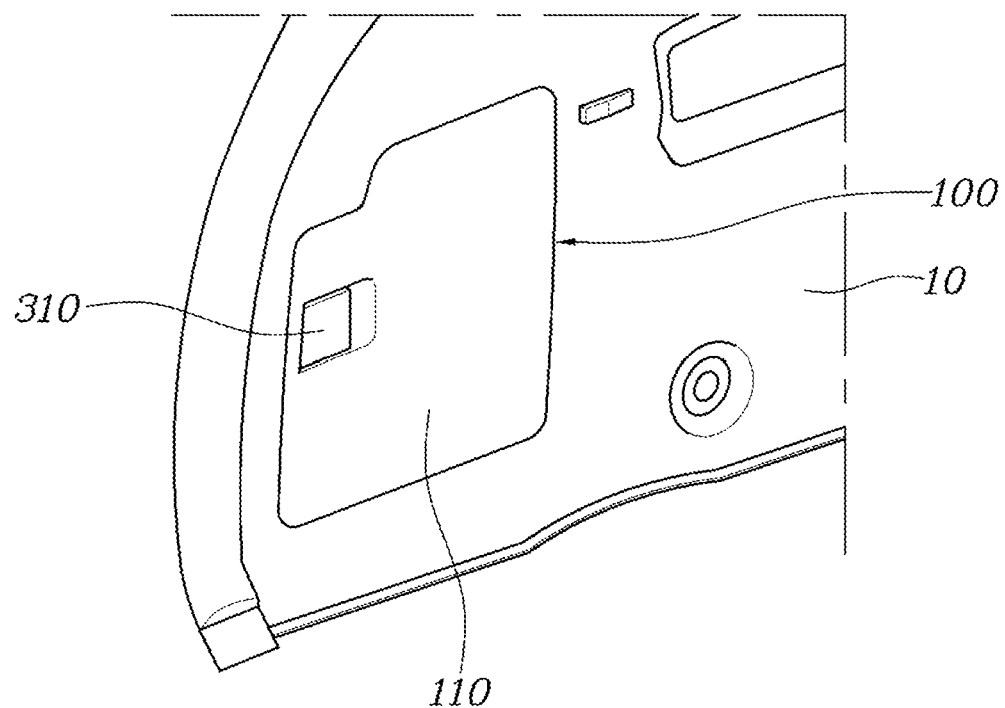
FIG. 1 is a view illustrating the state in which a main tray of the vehicular luggage tray apparatus according to the present disclosure is received in a reception space in a luggage side trim.

Specific structural and functional descriptions of embodiments of the present disclosure disclosed herein are only for purposes of illustration of the embodiments of the present disclosure. The present disclosure may be embodied in many different forms without departing from the spirit and significant characteristics of the present disclosure. Therefore, the embodiments of the present disclosure are disclosed only for illustrative purposes, and should not be construed as limiting the present disclosure.

Reference will now be made in detail to various embodiments of the present disclosure, specific examples of which are illustrated in the accompanying drawings and described below, since the embodiments of the present disclosure can be variously modified in many different forms. While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents and other embodiments that may be included within the spirit and scope of the present disclosure as defined by the appended claims.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, a second element could also be termed a first element.

It will be understood that when an element is referred to as being "coupled" or "connected" to another element, it can be directly coupled or connected to the other element, or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be understood in the same way.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc., when used in this specification, specify the presence of stated features, integers, steps, operations, elements, components, and/or combinations thereof, but do not preclude the presence or addition of one or more other features, integers, steps, operations, elements, components, and/or combinations thereof.

Unless otherwise defined, all terms including technical and scientific terms used herein have the same meanings as those commonly understood by one of ordinary skill in the art to which this disclosure belongs. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

The control unit (controller) according to an exemplary embodiment of the present disclosure may be embodied by nonvolatile memory (not shown) configured to store an algorithm configured to control the operation of various components of a vehicle or data relating to software instructions for executing the algorithm and a processor (not shown) configured to perform operations, which will be described below, using the data stored in the memory. Here, the memory and the processor may be embodied by separate chips. Alternatively, the memory and the processor may be embodied by a single chip in which the memory and the processor are integrated with each other. The processor may include one or more processors.

Hereinafter, a vehicular luggage tray apparatus according to a preferred embodiment of the present disclosure will be described with reference to FIGS. 1 to 19.

Figure 2:
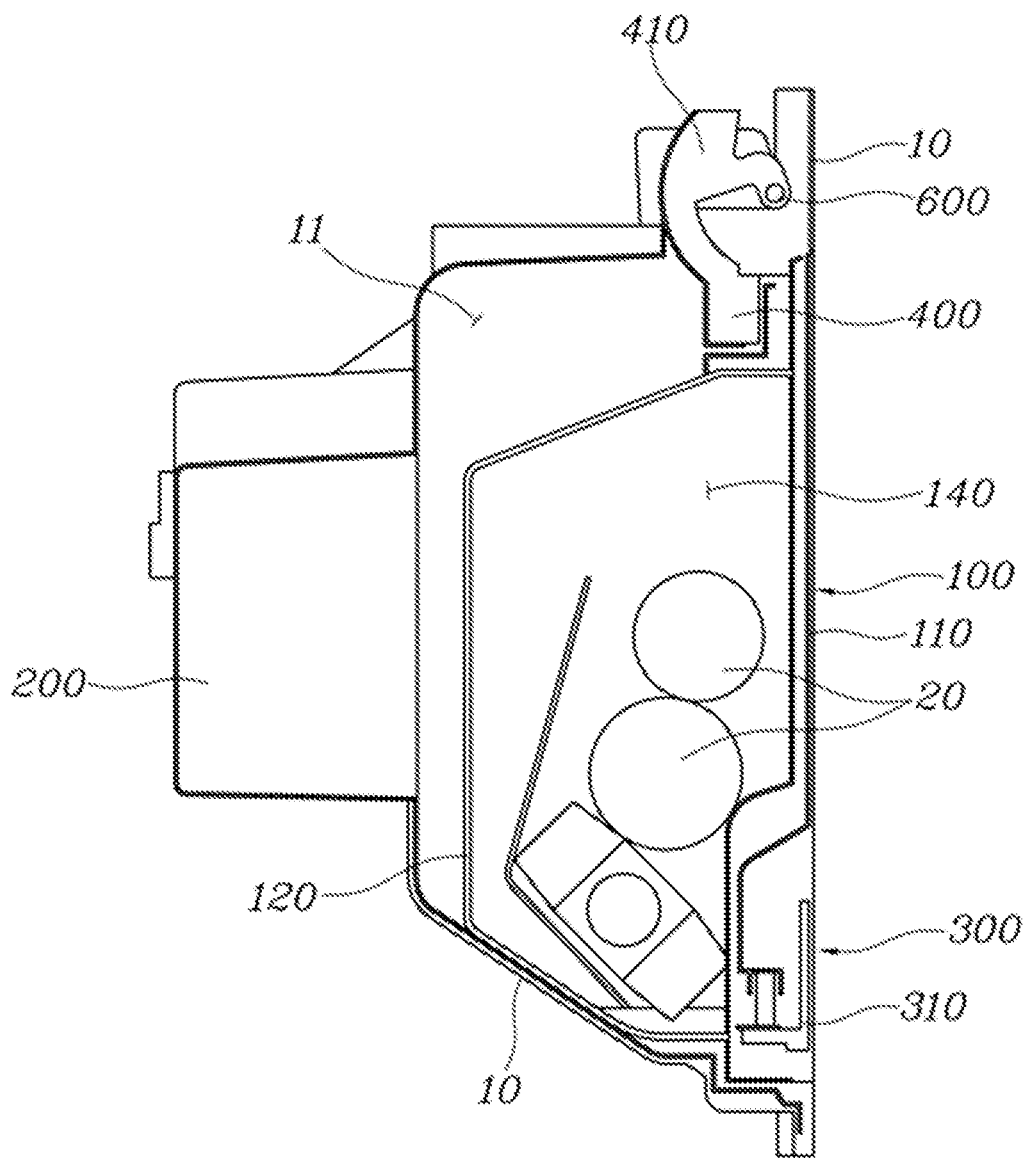
FIG. 2 is a cross-sectional view of FIG. 1.
Figure 3:
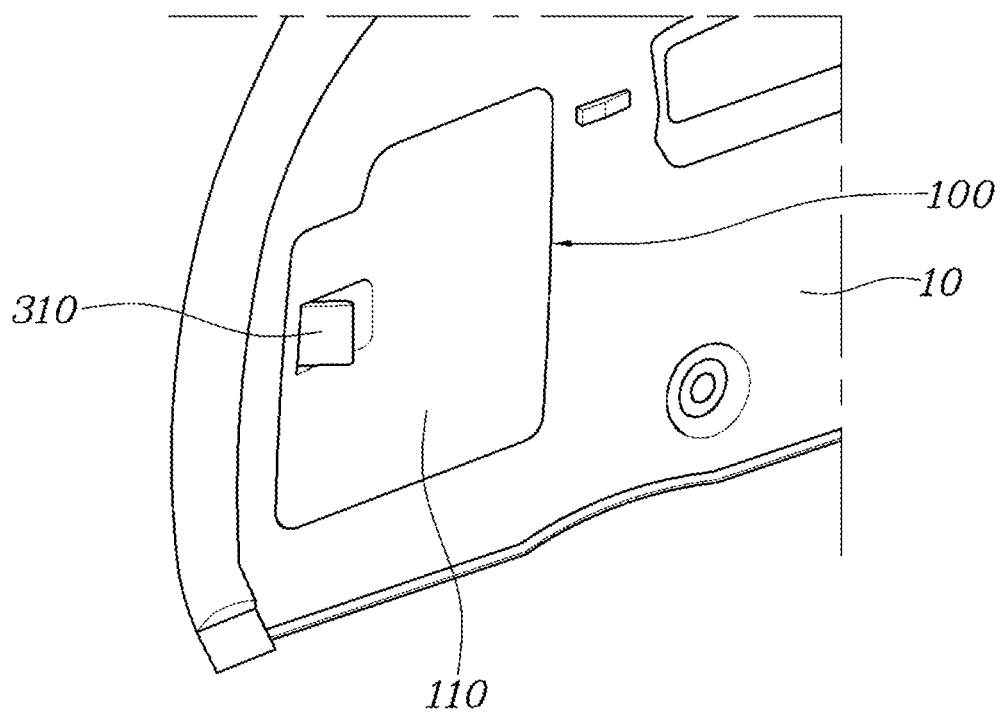
FIG. 3 is a view illustrating the state in which the main tray is released from the locked state by rotation of a locking knob.
Figure 4:
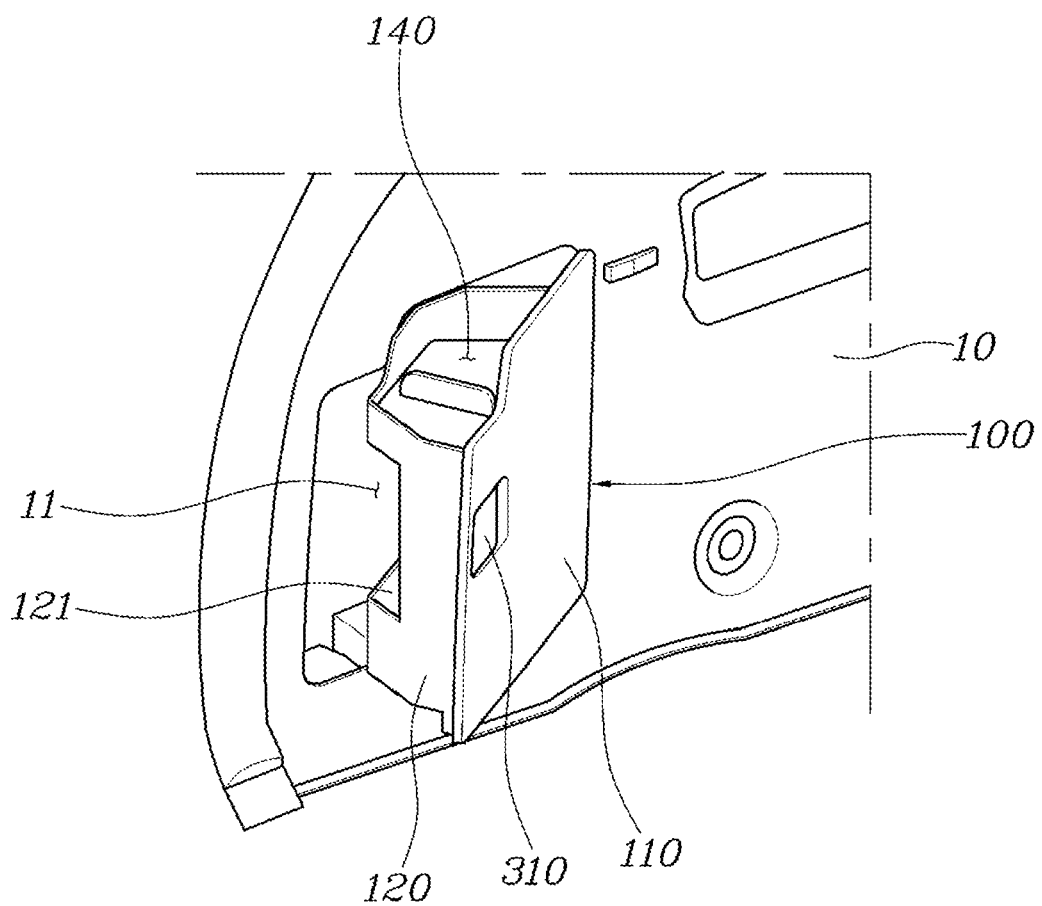
FIG. 4 is a view illustrating the state in which the main tray, which is released from the locked state, is automatically rotated and is first removed by the elastic force of a hinge spring.
Figure 5:
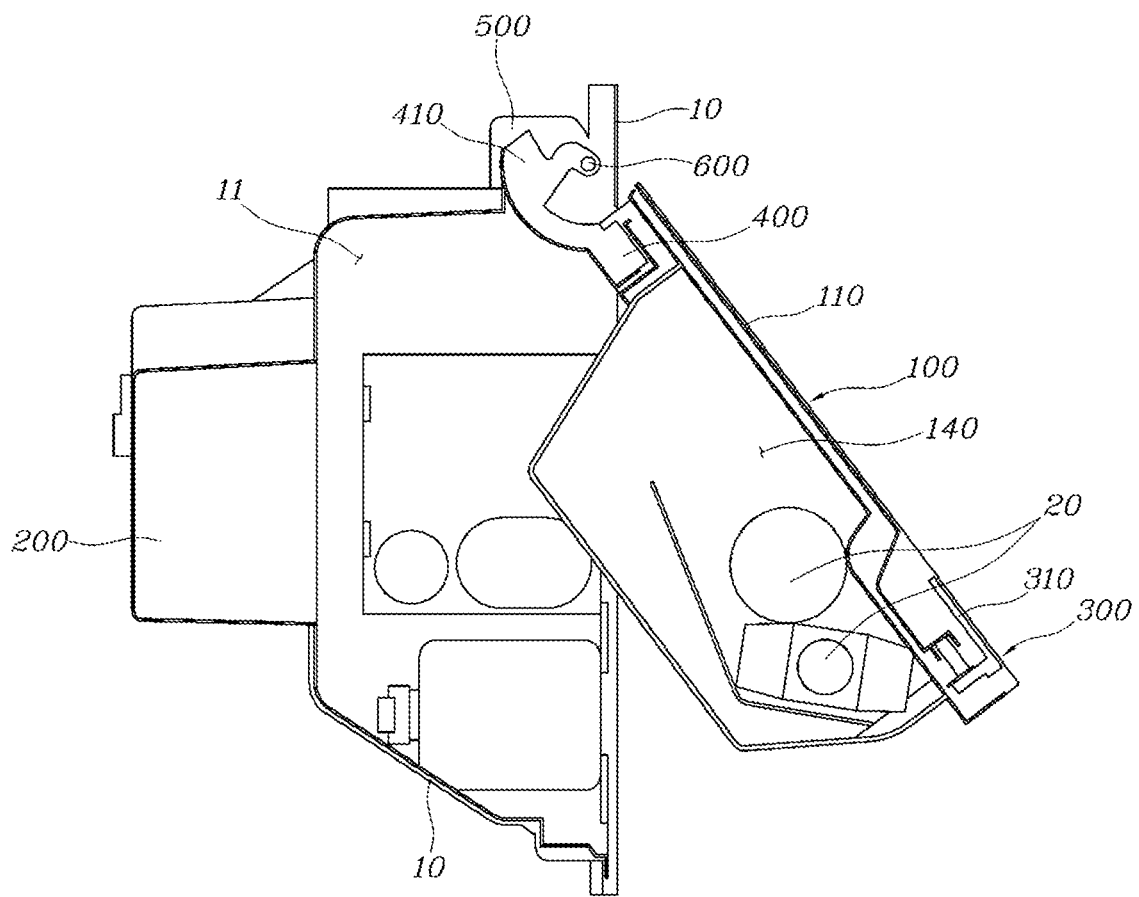
FIG. 5 is a cross-sectional view of FIG. 4.
Figure 6:
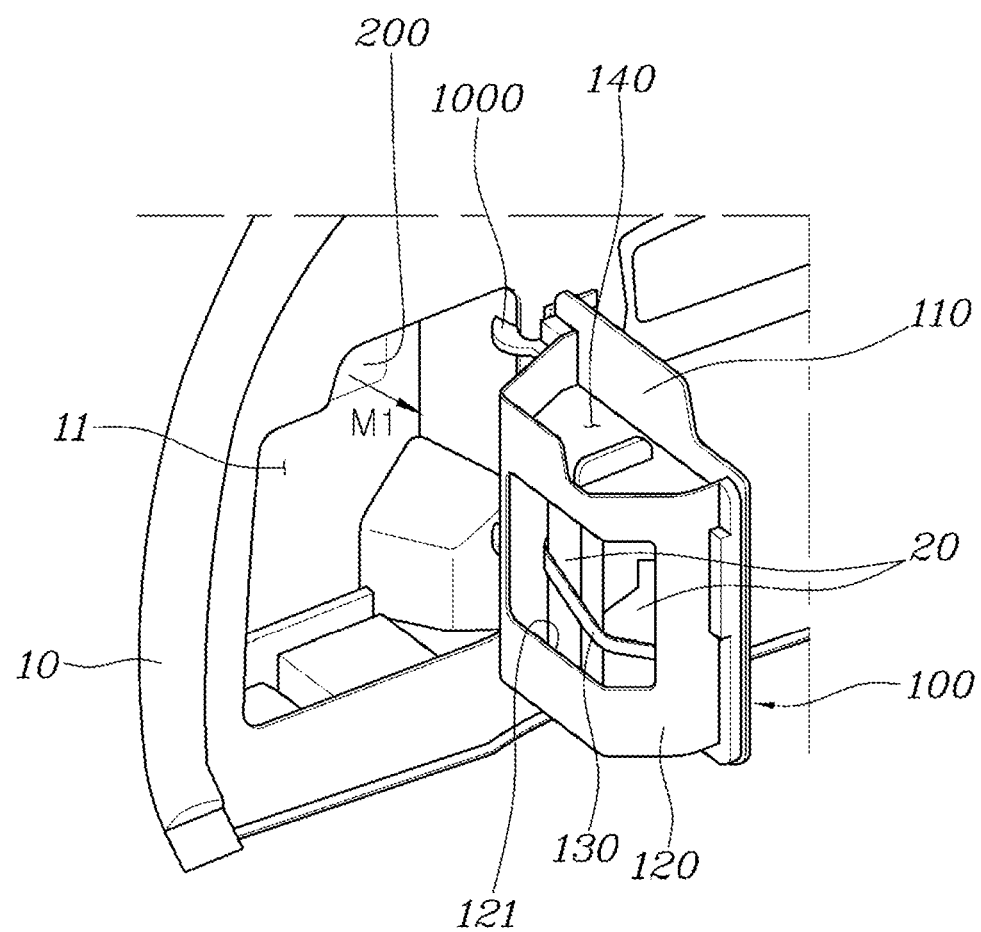
FIG. 6 is a view illustrating the state in which the main tray, which is first removed, is further removed by manually rotating the main tray.
Figure 7:
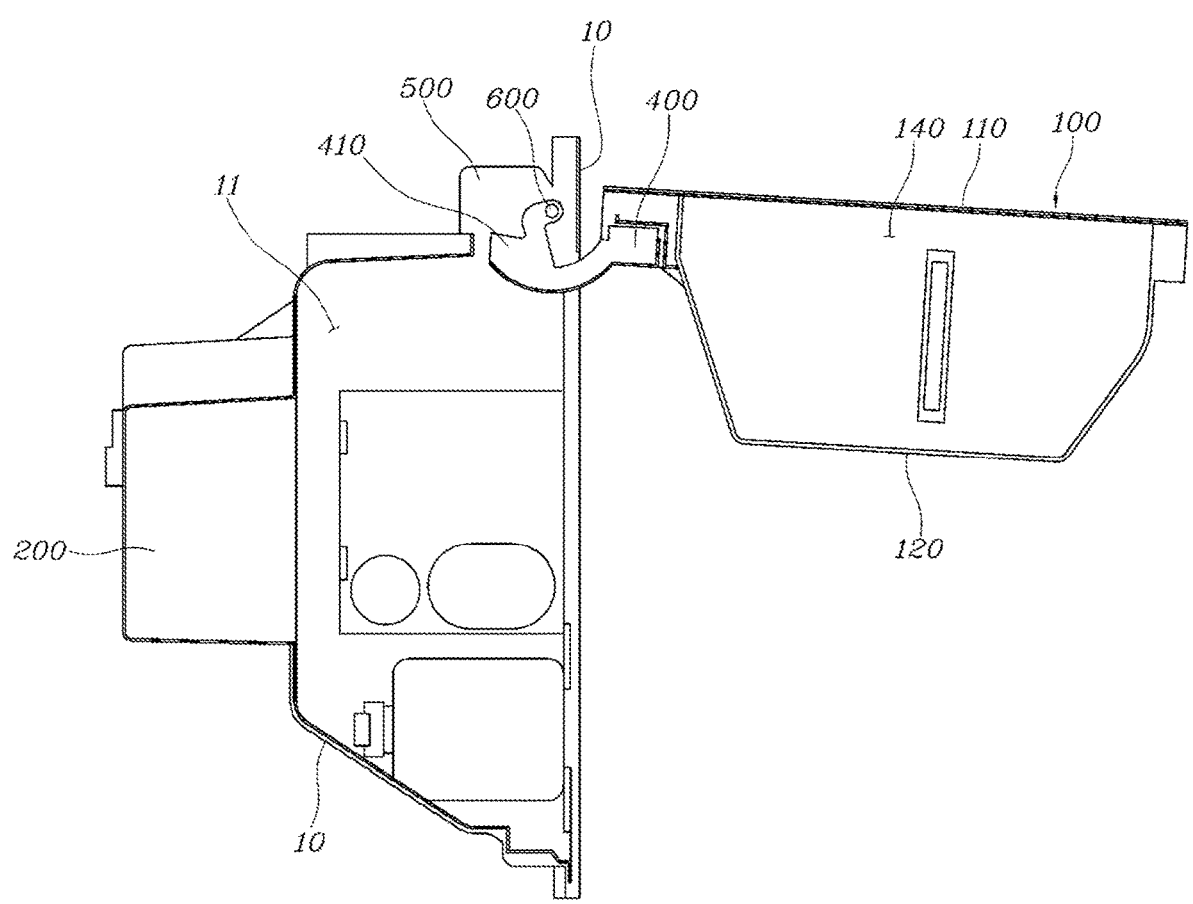
FIG. 7 is a cross-sectional view of FIG. 6.
Figure 8:
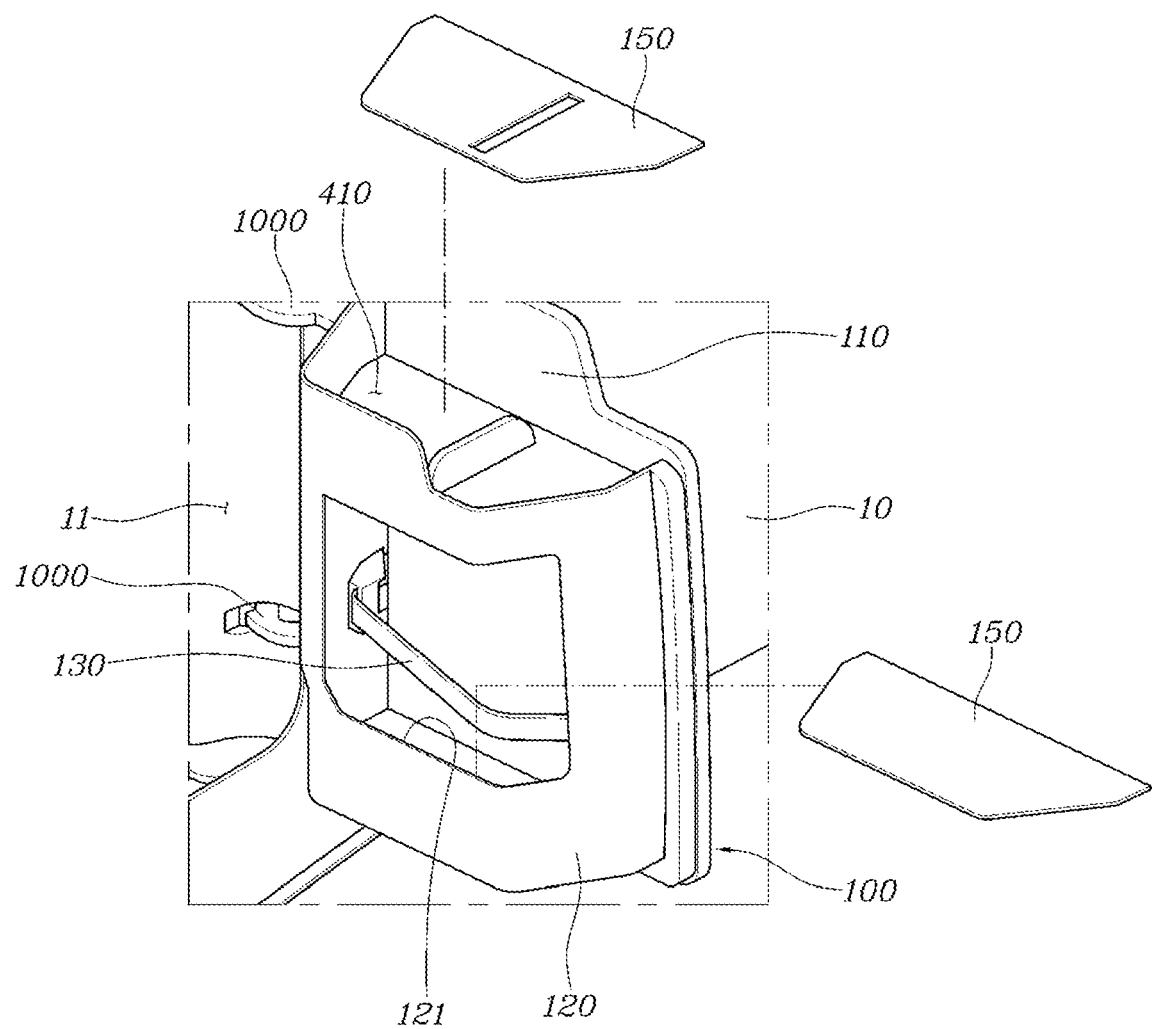
FIG. 8 is a view illustrating pad members, which are respectively mounted on the inner bottom surface of a tray body and the bottom surface of an upper shelf according to the present disclosure.

FIG. 1 is a view illustrating the state in which a main tray of the vehicular luggage tray apparatus according to the present disclosure is received in a reception space in a luggage side trim. FIG. 2 is a cross-sectional view of FIG. 1. FIG. 3 is a view illustrating the state in which the main tray is released from the locked state by rotation of a locking knob. FIG. 4 is a view illustrating the state in which the main tray, which is released from the locked state, is automatically rotated and is first opened outwardly by the elastic force of a hinge spring. FIG. 5 is a cross-sectional view of FIG. 4. FIG. 6 is a view illustrating the state in which the main tray, which is first opened, is secondly opened by manually rotating the main tray. FIG. 7 is a cross-sectional view of FIG. 6. FIG. 8 is a view illustrating pad members, which are respectively mounted on the inner bottom surface of a tray body and the bottom surface of an upper shelf according to the present disclosure.

As illustrated in the drawings, the vehicular luggage tray apparatus according to an embodiment of the present disclosure includes a main tray 100 and a sub tray 200.

The main tray 100 is received and mounted in the reception space 11 defined by a luggage side trim (a trim in the internal space of the vehicle) 10, and the main tray 100 received in the reception space 11 may be opened outwardly into a luggage room by manual manipulation by a user so as to be used.

In other words, the main tray 100 is rotated so as to be received in the reception space 11 or to be opened outwardly into the luggage room from the reception space 11.

When the locked state of the main tray 100 is released in the state of being received in the reception space 11, the main tray 100 is automatically rotated and is first taken out therefrom to a predetermined angle by the spring force (the elastic force) of a rotational hinge. After the main tray 100 is automatically rotated and is taken out by the spring force, the main tray 100 is secondly further rotated to a greater angle through manual manipulation by a user, thereby completing the secondary removal of the main tray 100.

The sub tray 200 is disposed inside the inner wall of the reception space 11 so as to be hidden by the inner wall. When the main tray 100 is opened into the luggage room from the reception space 11, the reception space 11 becomes empty. At this time, the sub tray 200, which is hidden by the inner wall of the reception space 11, is manually taken into the reception space 11 so as to be used (see arrow M1 in FIG. 6).

The reception space 11 in the luggage side trim 10, in which the main tray 100 is received, and the space in the luggage side trim 10, in which the sub tray 200 is received, are the unused space in a side wall of the luggage (the space remaining when optional accessories such as an air conditioner for a rear seat, a subwoofer or the like are not installed). Accordingly, since the present disclosure is able to receive the main tray 100 and the sub tray 200 in the luggage side trim 10 by utilizing the unused space, the efficiency of utilization of space is increased.

Furthermore, since the present disclosure is able to receive and store goods in the main tray 100 and the sub tray 200 and to increase the amount of goods stored therein, storage capacity is increased.

In addition, since the present disclosure is able to prevent the goods received and stored in the reception space 11 from being exposed to the outside of the luggage room by utilizing the main tray 100 and the sub tray 200, appearance is improved.

Furthermore, since the present disclosure is able to permit the outline of the main tray 100 to be seen from the outside when the main tray 100 and the sub tray 200 are received in the luggage side trim 10, exposure of the main tray 100 and the sub tray 200 is minimized when received in the luggage side trim 10, and appearance is improved.

The main tray 100 according to the present disclosure includes a tray cover 110, adapted to open and close while the main tray 100 is rotated, and a tray body 120, which is coupled to the inner surface of the tray cover 110 and in which goods 20 are loaded.

The goods 20 are loaded in the tray body 120 through a body hole 121 formed in the tray body 120. The tray body 120 is provided with a tray strap 130 across the body hole 121, and the tray strap 130 serves to hold the goods 20 loaded in the tray body 120.

The tray strap 130 may be configured to be adjustable in length and to be flexible.

The tray body 120 may further include an upper shelf 140 such that less voluminous items may be additionally loaded on the upper shelf 140.

The inner bottom surface of the tray body 120 and the bottom surface of the upper shelf 140, on which the goods 20 are loaded, may be further provided with respective pad members 150 for preventing generation of noise. Although each of the pad members 150 may be composed of one of rubber and sponge, the present disclosure is not limited thereto.

Figure 9:
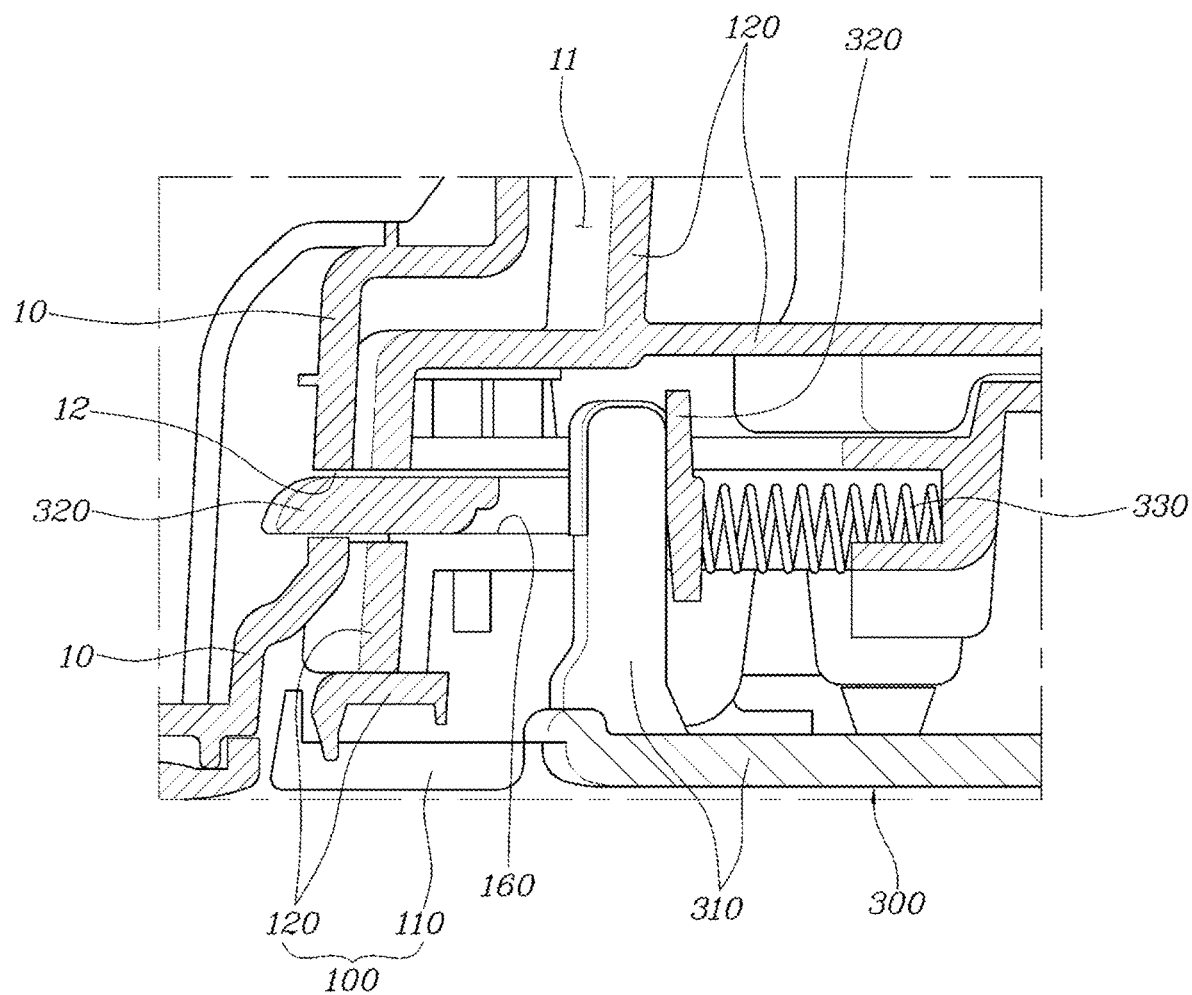
FIG. 9 is a cross-sectional view illustrating the state in which the main tray of the locking unit according to the present disclosure is locked.
Figure 10:
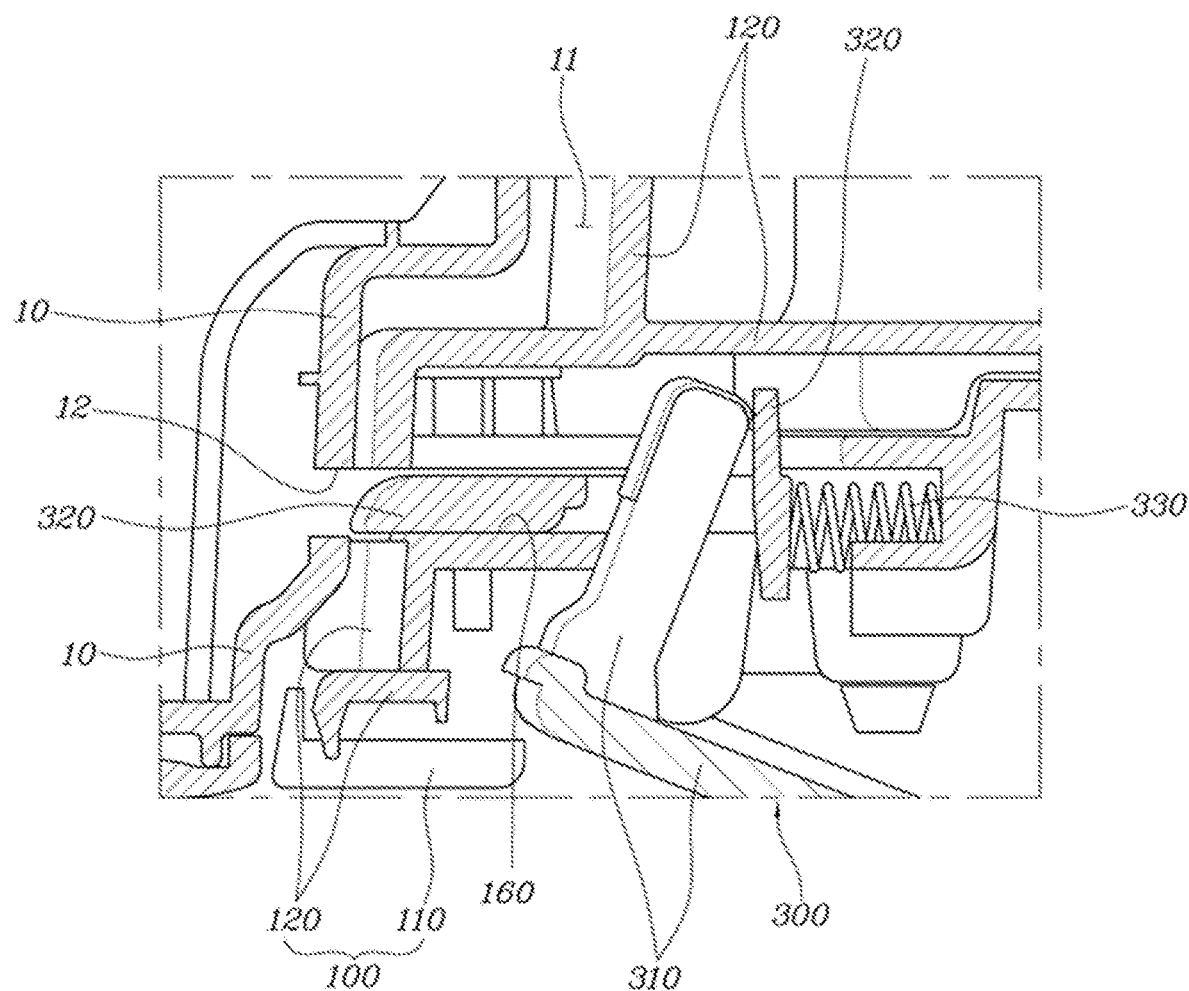
FIG. 10 is a cross-sectional view illustrating the state in which the locked state of the main tray is released by rotation of a locking knob.
Figure 11:
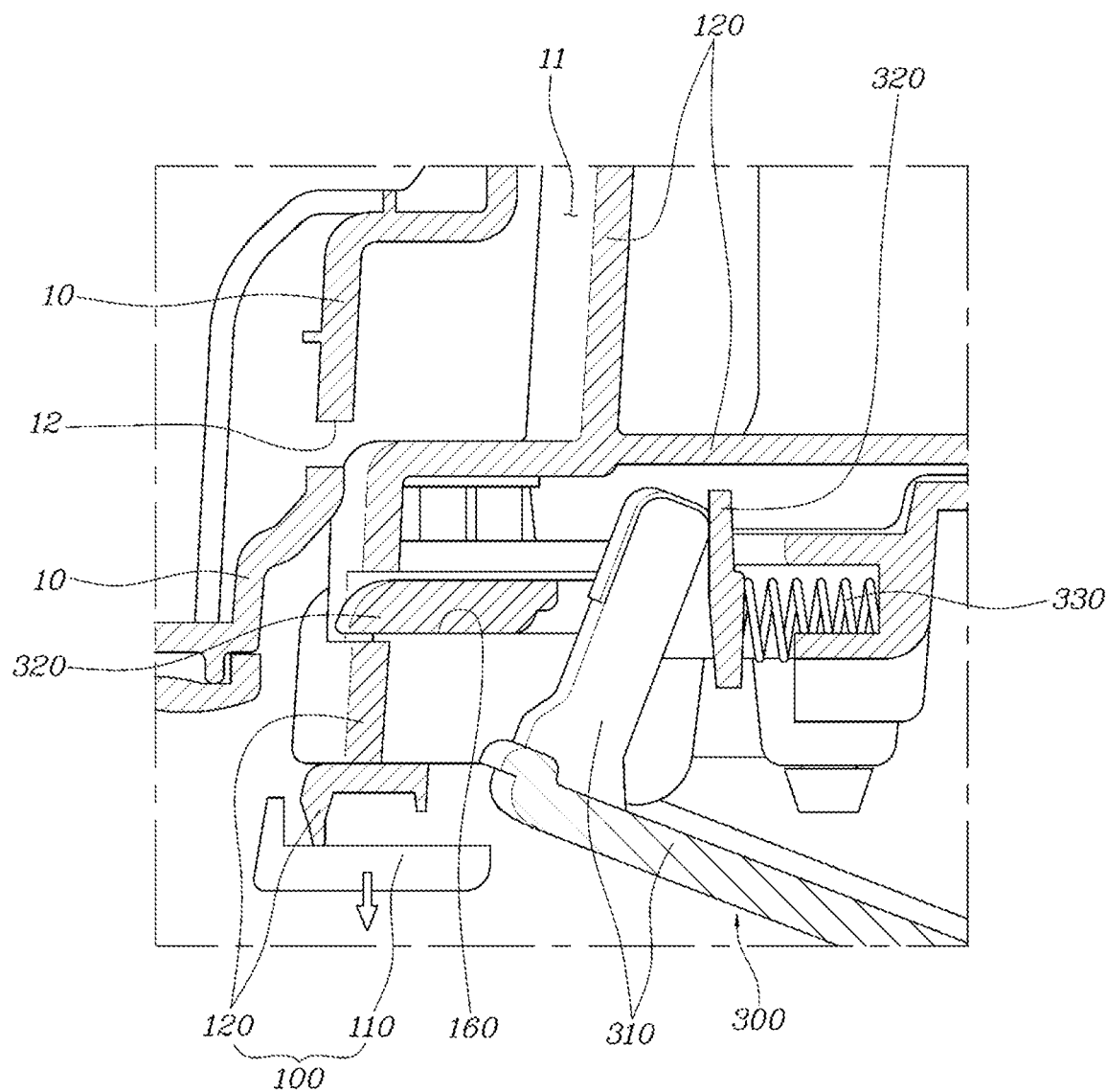
FIG. 11 is a cross-sectional view illustrating the state in which the main tray, which has been released from the locked state, is automatically rotated and is thus first removed by the spring force of the hinge portion.

FIGS. 9 to 11 are views explaining a locking unit according to the present disclosure. Among these, FIG. 9 is a cross-sectional view illustrating the state in which the main tray is locked, FIG. 10 is a cross-sectional view illustrating the state in which the locked state of the main tray is released by rotation of a locking knob, and FIG. 11 is a cross-sectional view illustrating the state in which the main tray, which has been released from the locked state, is automatically rotated and is thus first opened by the spring force of the hinge portion.

The vehicular luggage tray apparatus according to an embodiment of the present disclosure further includes a locking unit 300, which is provided in the main tray 100 to lock and unlock the luggage side trim 10. The main tray 100 is capable of being automatically rotated and thus being first opened when the locked state of the locking unit 300 is released.

The locking unit 300 includes a locking knob 310 rotatably coupled to the front surface of the main tray 100, that is, the tray cover 110, a locking rod 320, which is in contact with the locking knob 310 and is movable along a guide groove 160 formed in the main tray 100, and a locking spring 330 disposed in the guide groove 160 so as to elastically support the locking rod 320.

When the free end of the locking rod 320 is inserted in a locking hole 12 formed in the luggage side trim 10 because the locking knob 310 is not manipulated by a user, the main tray 100 is maintained in the locked state. The main tray 100 is inserted into the reception space 11 in the luggage side trim 10, and is maintained in the state of being received in the reception space 11 (the states in FIGS. 1, 2 and 9).

When the locking knob 310 is rotated by the user, the locking rod 320, which is in contact with the locking knob 310, is moved and inserted into the guide groove 160. Then the locking spring 330 is compressed, and the free end of the locking rod 320 is separated from the locking hole 12, thereby releasing the locked state of the main tray 100 (the states in FIGS. 3 and 10).

When the locked state of the main tray 100 is released by manual manipulation of the locking knob 310, the main tray 100 is automatically rotated and is first opened to a predetermined angle by the spring force of the hinge portion (the states in FIGS. 4, 5 and 11).

After the main tray 100 is automatically rotated and is firstly opened to a predetermined angle by the spring force of the hinge portion, the main tray 100 is further rotated by manual manipulation by the user, whereby the second removal of the main tray 100 to a wider opening angle is completed (the states in FIGS. 6 and 7).

Figure 12:
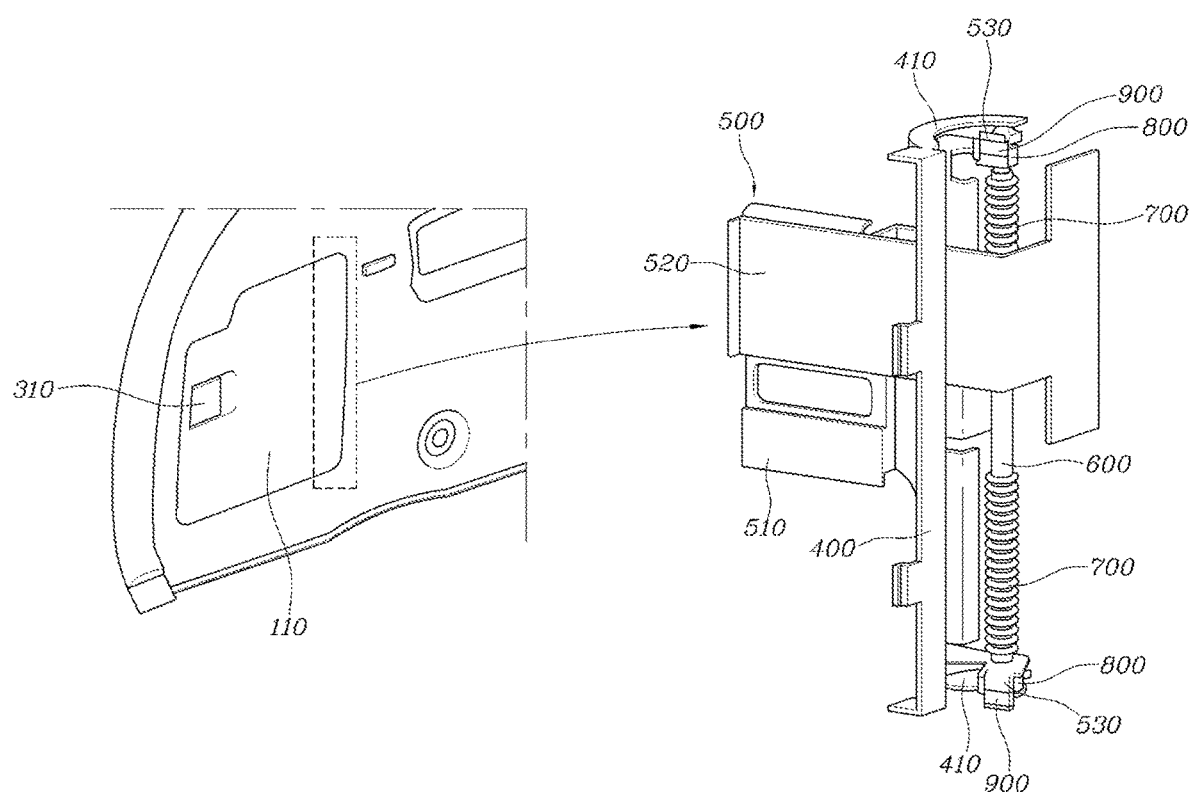
FIG. 12 is a view illustrating the state in which the main tray is received in the reception space.
Figure 13:
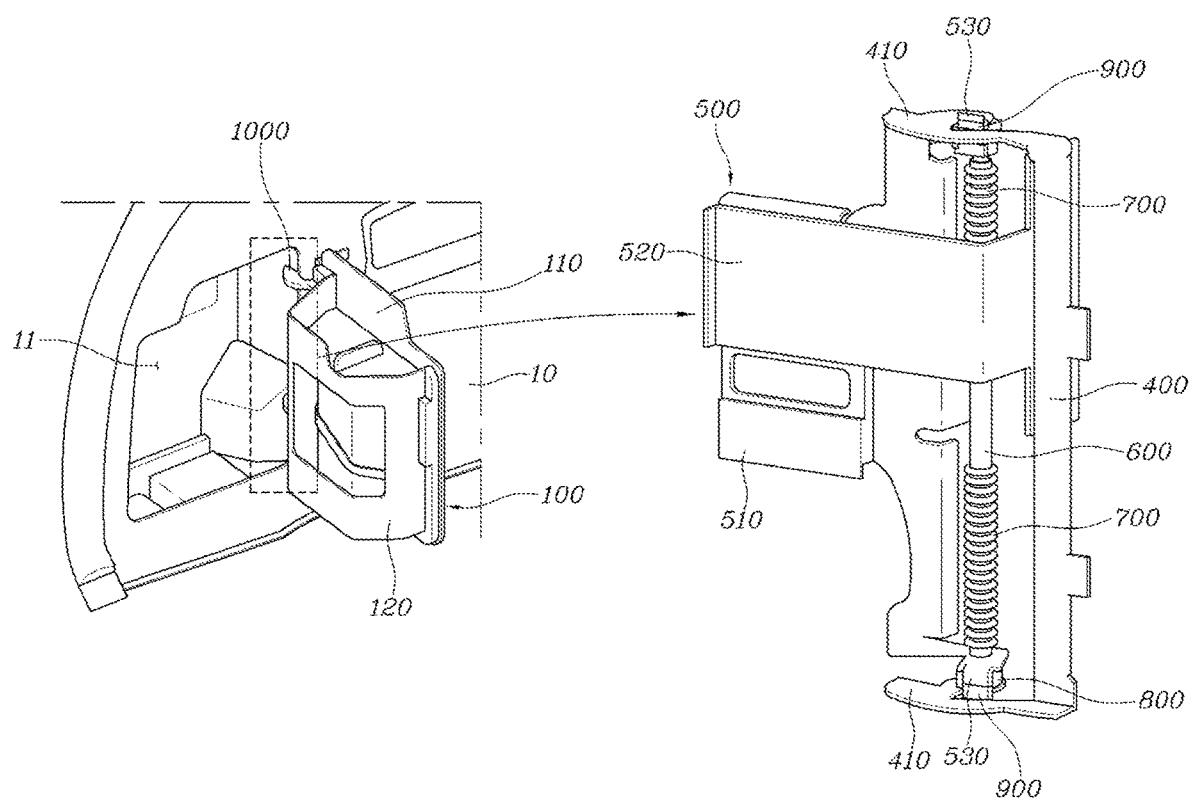
FIG. 13 is a view illustrating the state in which the main tray is rotated and taken out of the reception space.

FIGS. 12 and 13 are views explaining a rotating hinge bracket and a stationary hinge bracket, which constitute the hinge portion of the main tray according to the present disclosure. Among these, FIG. 12 is a view illustrating the state in which the main tray is received in the reception space, and FIG. 13 is a view illustrating the state in which the main tray is rotated and taken out of the reception space.

Figure 14:
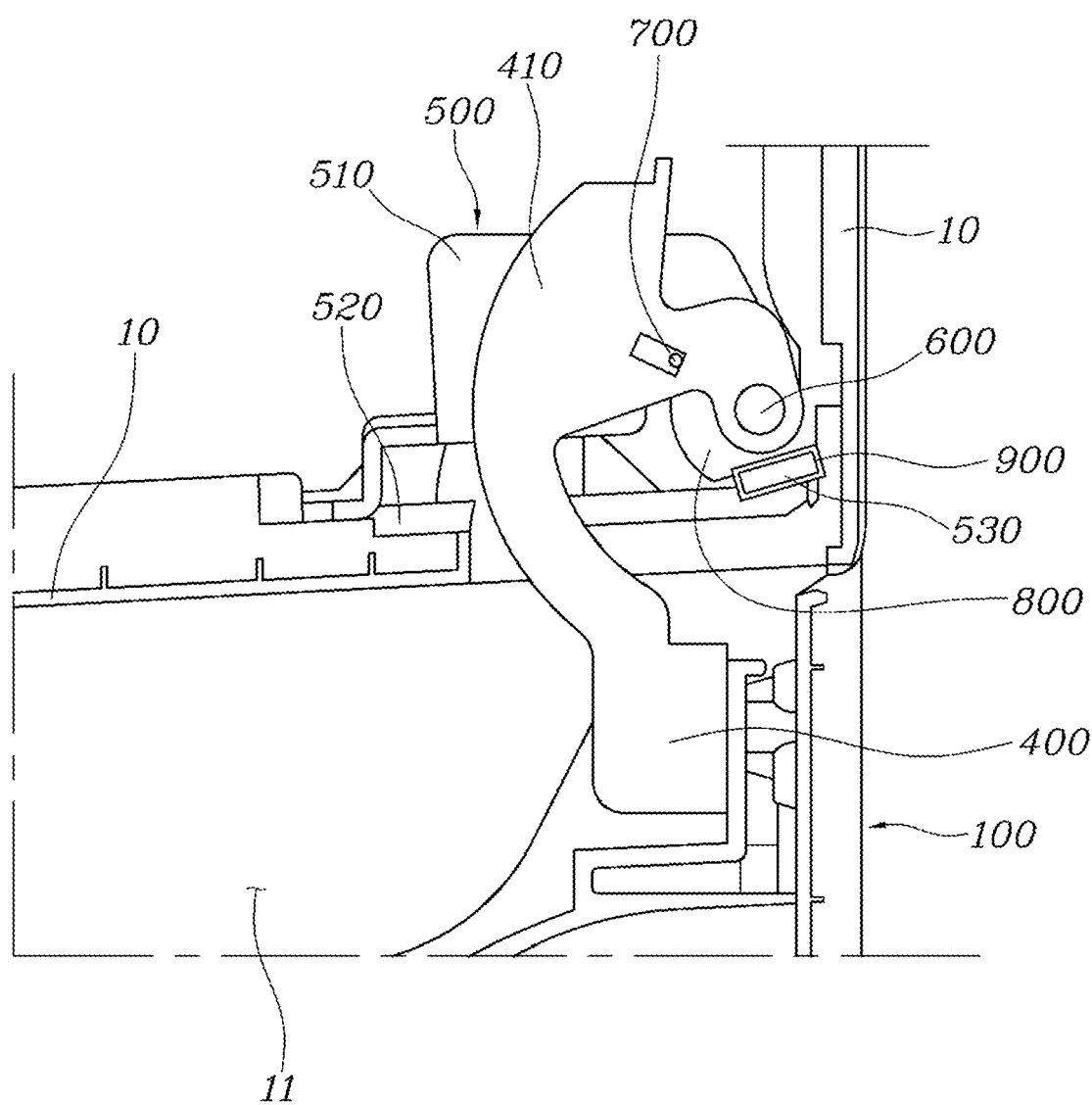
FIG. 14 is a plan cross-sectional view illustrating a rotating portion and a stopper of the rotating hinge bracket when the main tray is received in the reception space.
Figure 15:
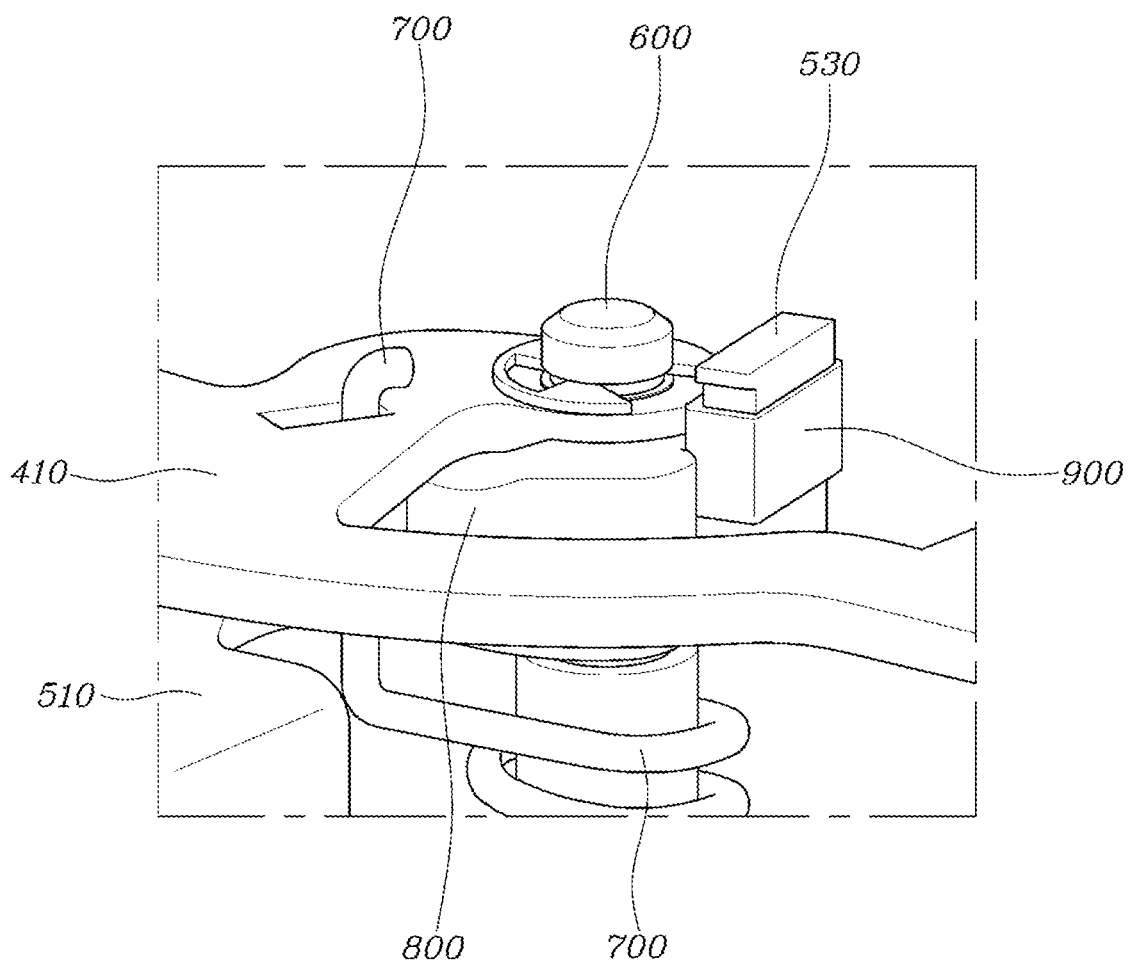
FIG. 15 is a perspective view illustrating a region in which the stopper is positioned.
Figure 16:
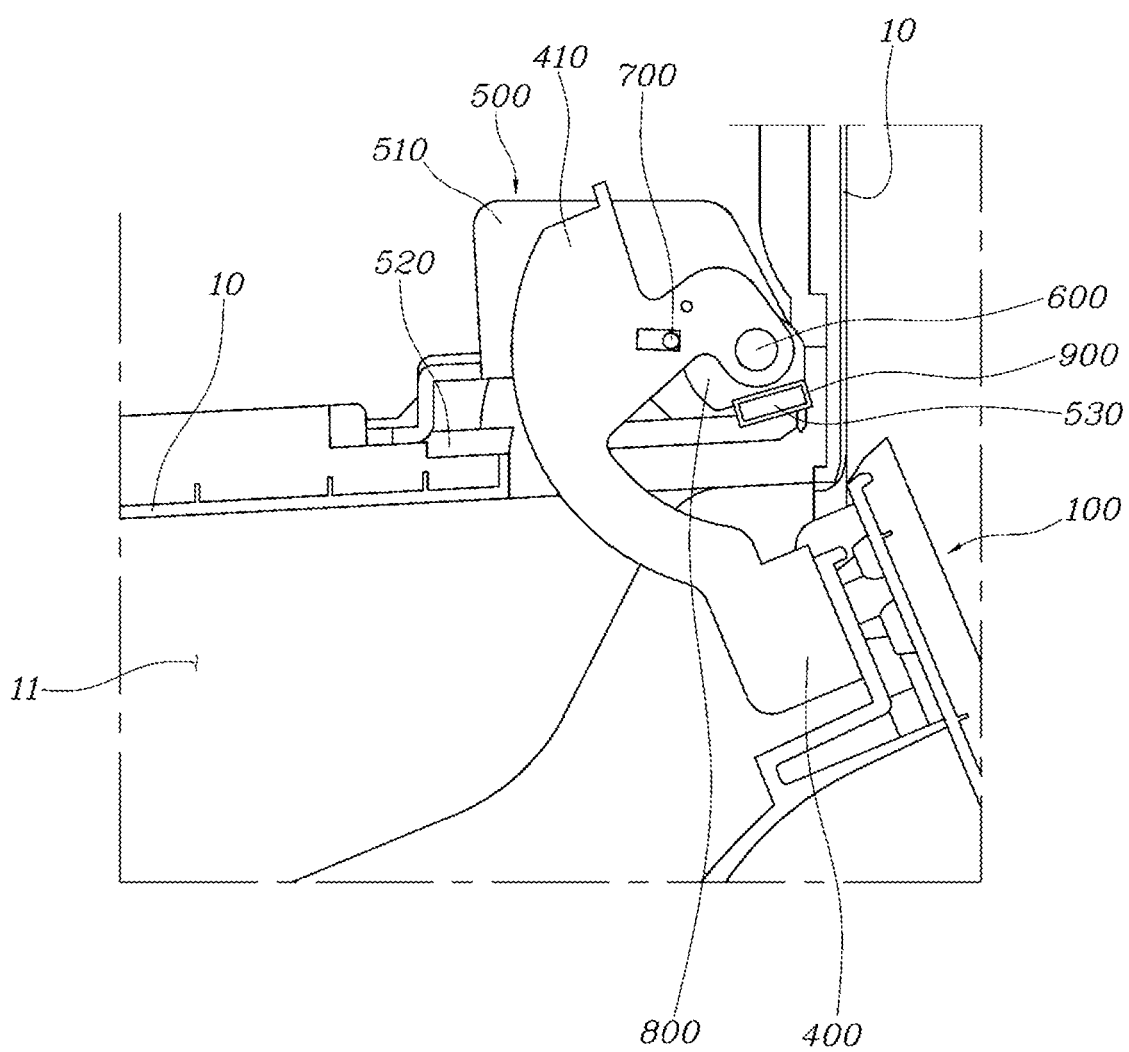
FIG. 16 is a plan cross-sectional view illustrating the state in which the hinge portion of the rotating hinge bracket comes into contact with the stopper when the main tray is automatically rotated and is first removed by the spring force of the hinge portion.
Figure 17:
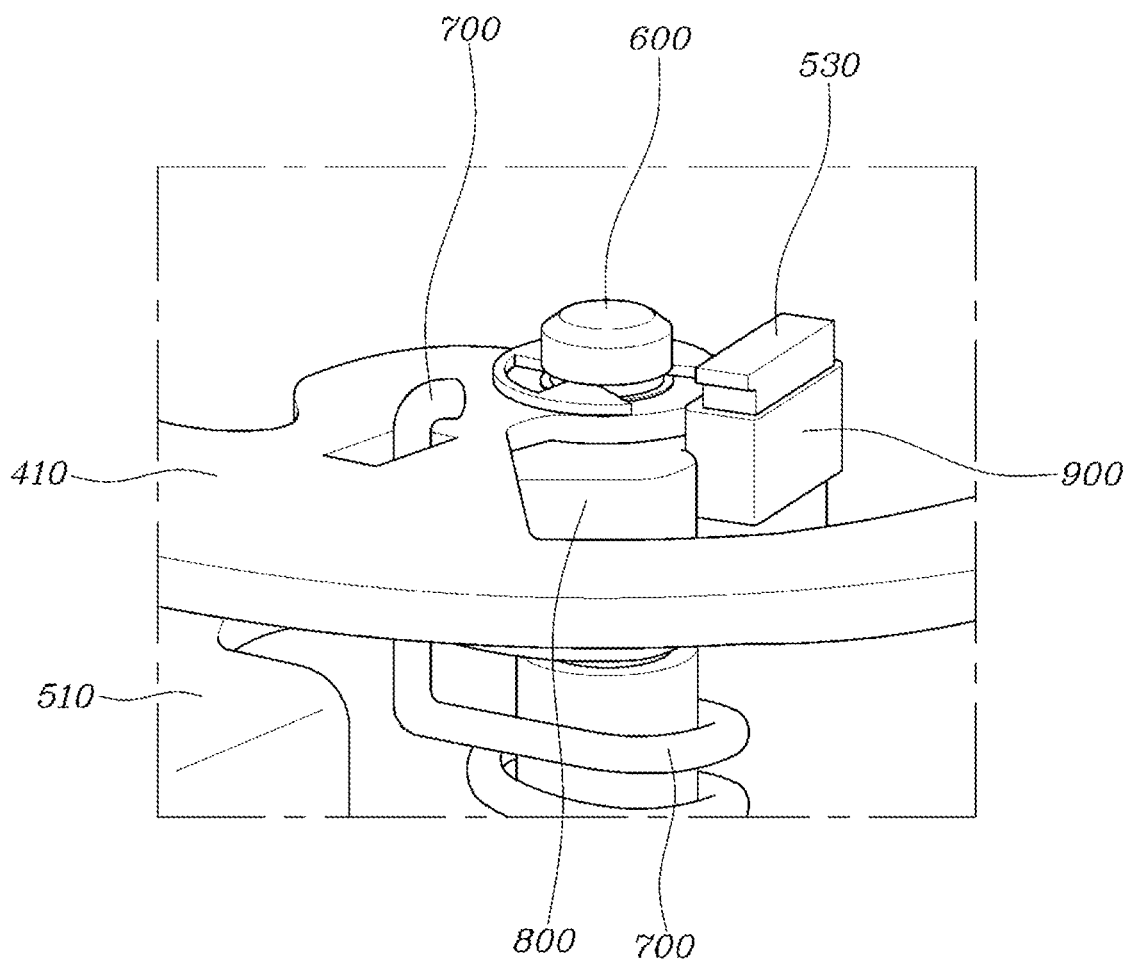
FIG. 17 is a perspective view illustrating a region in which the stopper is positioned in FIG. 16.
Figure 18:
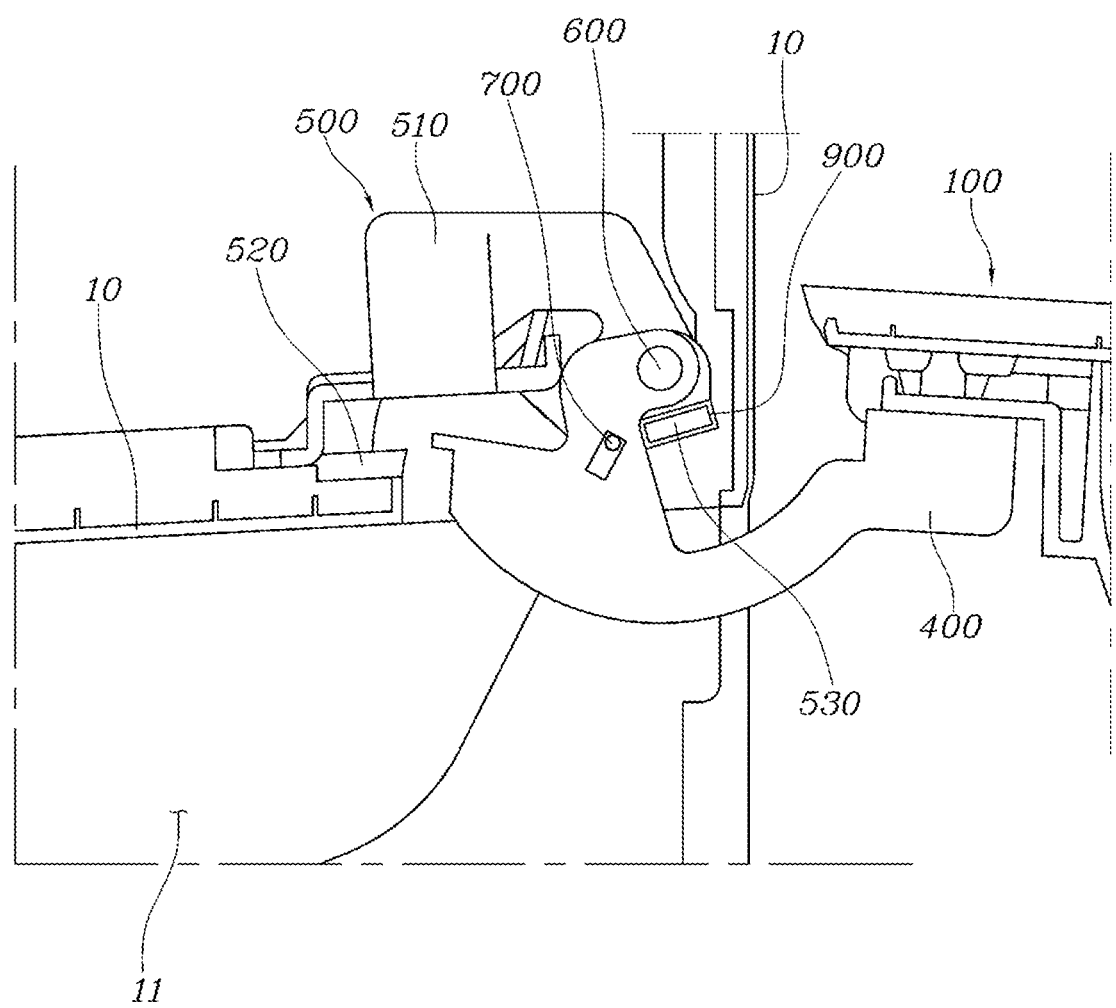
FIG. 18 is a plan cross-sectional view illustrating the states of the rotating portion and the stopper of the rotating hinge bracket when the main tray is secondly taken out by manual manipulation by the user.
Figure 19:
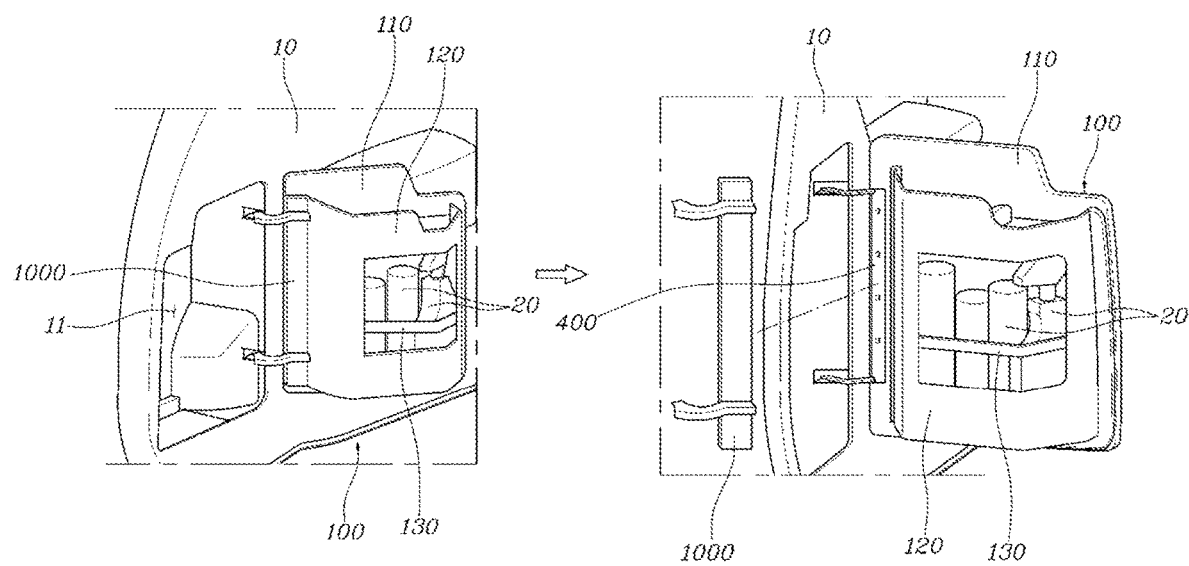
FIG. 19 is a view illustrating the state in which the rotating hinge bracket is coupled to a bracket cover.

FIG. 14 is a plan cross-sectional view illustrating a rotating portion and a stopper of the rotating hinge bracket when the main tray is received in the reception space. FIG. 15 is a perspective view illustrating a region in which the stopper is positioned. FIG. 16 is a plan cross-sectional view illustrating the state in which the hinge portion of the rotating hinge bracket comes into contact with the stopper when the main tray is automatically rotated and is first opened by the spring force of the hinge portion. FIG. 17 is a perspective view illustrating a region in which the stopper is positioned in FIG. 16. FIG. 18 is a plan cross-sectional view illustrating the states of the rotating portion and the stopper of the rotating hinge bracket when the main tray is further opened by manual manipulation by the user. FIG. 19 is a view illustrating the state in which the rotating hinge bracket is coupled to a bracket cover.

The vehicular luggage tray apparatus according to an embodiment of the present disclosure further includes a rotating hinge bracket 400 coupled to a side surface of the main tray 100, a stationary hinge bracket 500 coupled to the luggage side trim 10 at a position corresponding to the rotating hinge bracket 400, a hinge shaft 600, which extends through the rotating hinge bracket 400 and the stationary hinge bracket 500 and connects the two brackets to each other, and a hinge spring 700, which is wound around the hinge shaft 600 and which is supported at one end thereof by the rotating hinge bracket 400 and at the other end thereof by the stationary hinge bracket 500.

As the rotating hinge bracket 400 is rotated about the hinge shaft 600 with respect to the stationary hinge bracket 500, the main tray 100 is rotated with respect to the luggage side trim 10. At this time, the main tray 100 is automatically rotated and is first opened to a predetermined angle by the elastic force of the hinge spring 700.

While the main tray 100 is received in the reception space 11 in the luggage side trim 10 and the locking unit 300 is maintained in the locked state, the rotating hinge bracket 400 is maintained in the state of being rotated clockwise, as illustrated in FIG. 12, and the hinge spring 700 is maintained in the compressed state.

When the locked state of the main tray 100 is released by manual manipulation of the locking knob 310 by a user, the rotating hinge bracket 400 is rotated counterclockwise to the state shown in FIG. 13 from the state shown in FIG. 12 by the elastic force of the hinge spring 700. Consequently, the main tray 100 is automatically rotated and is first opened to a predetermined angle by the elastic force of the hinge spring 700.

The stationary hinge bracket 500 includes a first stationary bracket 510, through the upper and lower ends of which the hinge shaft 600 extends, and a second stationary bracket 520, coupled to the first stationary bracket 510.

Stoppers 800 are fixedly coupled to the two ends of the stationary hinge bracket 500, and arched rotating portions 410 are provided at the two ends of the rotating hinge bracket 400 such that the hinge shaft 600 extends through the rotating portions 410. Consequently, when the main tray 100 is automatically rotated and is first opened by the elastic force of the hinge spring 700, the rotating portions 410 of the rotating hinge bracket 400 come into contact with the stoppers 800, thereby limiting the first opening angle of the main tray 100 (the state shown in FIGS. 16 and 17).

The stoppers 800 may be manufactured through injection molding to prevent generation of noise upon contact with the rotating portions 410.

As described above, when the locked state of the main tray 100 is released, the main tray 100 is automatically rotated and is first opened by the elastic force of the hinge spring 700. Subsequently, when the main tray 100 is manually pulled or pushed and is further rotated open by a user, the rotating portions 410 of the rotating hinge bracket 400 are rotated along the upper surfaces of the stoppers 800, with the result that the main tray 100 is manually rotated and is secondly opened (the state shown in FIG. 18).

The stationary hinge bracket 500 is provided at the two ends thereof with respective bracket protrusions 530. A pad member 900 is coupled to each of the bracket protrusions 530 so as to eliminate noise due to contact with the rotating portion 410. Although the pad member 900 may be made of rubber, the present disclosure is not limited thereto.

When the main tray 100 is rotated and opened as illustrated in FIG. 19, the rotating hinge bracket 400 coupled to the main tray 100 is exposed to the outside. Here, because the rotating hinge bracket 400 is generally made of stainless steel, exposure of the rotating hinge bracket 400 to the outside deteriorates the appearance. According to the present disclosure, a bracket cover 1000 is coupled to the rotating hinge bracket 400 to prevent exposure of the rotating hinge bracket 400 to the outside and thus to improve the appearance.

As is apparent from the above description, since the vehicular luggage tray apparatus according to the embodiment of the present disclosure is capable of receiving and storing the goods 20 in both the main tray 100 and the sub tray 200, there are advantages of increasing the amount of goods stored therein and of increasing the storage capacity.

Furthermore, since the vehicular luggage tray apparatus according to the embodiment of the present disclosure is capable of receiving the main tray 100 and the sub tray 200 by utilizing an unused space in the side wall of the luggage room, utilization of space is increased.

In addition, since the vehicular luggage tray apparatus according to the embodiment of the present disclosure is capable of preventing the goods received in the reception space 11 from being exposed to the outside of the luggage room by virtue of the main tray 100 and the sub tray 200, thus improving the appearance.

Furthermore, since the vehicular luggage tray apparatus according to the embodiment of the present disclosure is capable of allowing only the outline of the main tray 100 to be seen from the outside when the main tray 100 and the sub tray 200 are received in the luggage side trim 10, exposure of the main tray 100 and the sub tray 200 when received in the luggage side trim 10 is minimized, thus improving the appearance.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

The invention claimed is:

1. A vehicular luggage tray apparatus comprising:
   a main tray configured to be rotated with respect to a trim in an internal space in a vehicle, the main tray being configured to be received in a reception space in the trim and to be opened therefrom,
   wherein, when the main tray is released from a locked state when the main tray is received in the reception space, the main tray is automatically rotated and opened to a predetermined opening angle by elastic force of a rotating hinge portion;
   wherein the main tray includes a tray cover configured to open and close the reception space when the main tray is rotated, and a tray body which is coupled to an inner surface of the tray cover and in which an item is loaded; and
   wherein the tray body includes an upper shelf.

2. The vehicular luggage tray apparatus according to claim 1, wherein after the main tray is automatically rotated and opened by the elastic force, the main tray is further rotated to a wider opening angle by manual manipulation by a user.

3. The vehicular luggage tray apparatus according to claim 1, further comprising a sub tray, which is opened into the reception space from an inner wall of the reception space after the main tray is opened into the reception space.

4. The vehicular luggage tray apparatus according to claim 1,
   wherein the tray body has a body hole formed therein through which the item is inserted and loaded in the tray body.

5. The vehicular luggage tray apparatus according to claim 4, further comprising a tray strap disposed across the body hole to hold the item loaded in the tray body.

6. The vehicular luggage tray apparatus according to claim 1, wherein an inner bottom surface of the tray body and a bottom surface of the upper shelf each include a pad member for preventing noise generation.

7. The vehicular luggage tray apparatus according to claim 1, further comprising a locking unit at the main tray to be locked to and unlocked from a luggage side trim,
   wherein the main tray is automatically rotated and is first opened by spring force when a locked state of the locking unit is released.

8. The vehicular luggage tray apparatus according to claim 7, wherein the locking unit includes:
   a locking knob rotatably coupled to a front surface of the main tray;
   a locking rod in contact with the locking knob and movable along a guide groove formed in the main tray; and
   a locking spring disposed in the guide groove to elastically support the locking rod;
   wherein the main tray is locked when an end of the locking rod is inserted into a locking hole formed in the luggage side trim, and the main tray is unlocked when the end of the locking rod is separated from the locking hole.

9. The vehicular luggage tray apparatus according to claim 1, further comprising:
   a rotating hinge bracket coupled to a side surface of the main tray;
   a stationary hinge bracket coupled to a luggage side trim at a position corresponding to the rotating hinge bracket; and
   a hinge shaft extending through the rotating hinge bracket and the stationary hinge bracket, and connects the rotating hinge bracket and the stationary hinge bracket to each other;
   wherein the main tray is rotated with respect to the luggage side trim when the rotating hinge bracket is rotated about the hinge shaft with respect to the stationary hinge bracket.

10. The vehicular luggage tray apparatus according to claim 9, further comprising a hinge spring wound around the hinge shaft and supported at one end thereof by the rotating hinge bracket and at an other end thereof by the stationary hinge bracket,
    wherein the main tray is automatically rotated and is opened to a predetermined opening angle by elastic force of the hinge spring.

11. The vehicular luggage tray apparatus according to claim 10, wherein a stopper is fixedly coupled to each of two ends of the stationary hinge bracket, and each of the two ends of the rotating hinge bracket is provided with a rotating portion through which the hinge shaft extends; and
    wherein, when the main tray is automatically rotated and is first opened by the elastic force of the hinge spring, the rotating portions of the rotating hinge bracket come into contact with the stoppers, thereby limiting the first opening angle to which the main tray is first rotated by the spring force.

12. The vehicular luggage tray apparatus according to claim 11, wherein, when the main tray is further opened by manual manipulation by a user after the main tray is first opened, the rotating portions are rotated along surfaces of the stoppers.

13. The vehicular luggage tray apparatus according to claim 12, wherein the two ends of the stationary hinge bracket are each provided with bracket protrusions such that, when the main tray is manually opened, the rotating portions of the rotating hinge bracket come into contact with the bracket protrusions, thereby limiting a second opening angle of the main tray.

14. The vehicular luggage tray apparatus according to claim 13, wherein each of the bracket protrusions includes a pad member coupled thereto for eliminating noise due to contact with the rotating portion.

15. The vehicular luggage tray apparatus according to claim 9, wherein a bracket cover is coupled to the rotating hinge bracket to prevent exposure of the rotating hinge bracket coupled to the main tray in a state in which the main tray is opened.

16. The vehicular luggage tray apparatus according to claim 9, wherein the sub tray is manually opened by a user.

17. A vehicular luggage tray apparatus comprising:
 a main tray configured to be rotated with respect to a trim in an internal space in a vehicle, the main tray being configured to be received in a reception space in the trim and to be opened therefrom;
 wherein, when the main tray is released from a locked state when the main tray is received in the reception space, the main tray is automatically rotated and opened to a predetermined opening angle by elastic force of a rotating hinge portion; and
 wherein after the main tray is automatically rotated and opened by the elastic force, the main tray is further rotated to a wider opening angle by manual manipulation by a user;
 a rotating hinge bracket coupled to a side surface of the main tray; and
 a stationary hinge bracket coupled to a luggage side trim at a position corresponding to the rotating hinge bracket;
 wherein, when the main tray is further opened by manual manipulation by a user after the main tray is first opened, the rotating hinge bracket is rotated along surfaces of the stationary hinge bracket.

* * * * *